Figure 5:
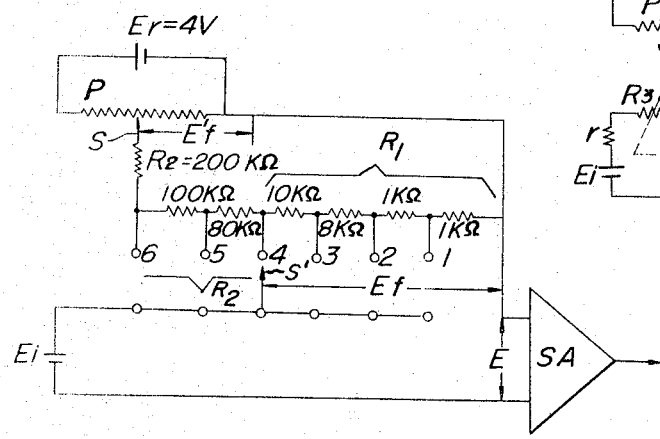

March 7, 1967  TOSHIO NUMAKURA  3,308,375
SCALE SPAN CHANGING INPUT CIRCUIT FOR
SELF-BALANCING INSTRUMENT
Filed Nov. 26, 1963  2 Sheets-Sheet 1
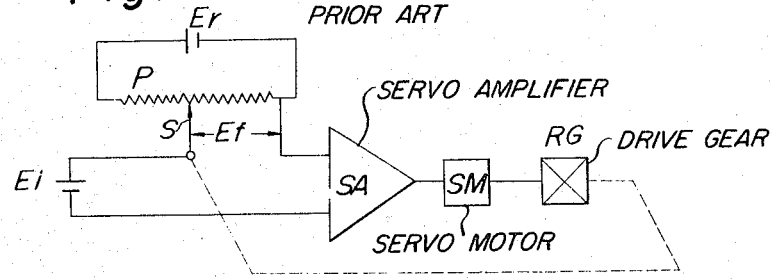
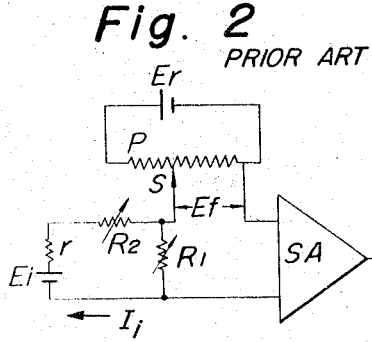
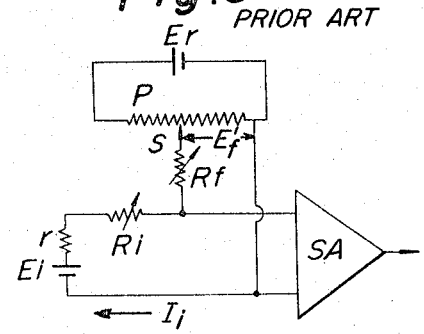
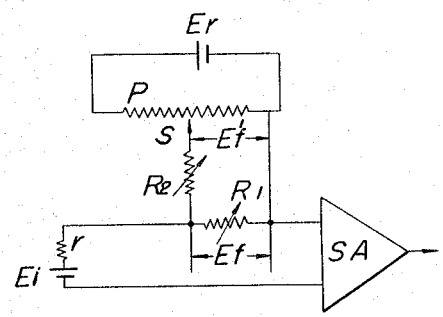
INVENTOR
TOSHIO NUMAKURA
BY Paul M. Craig, Jr.
ATTORNEY INVENTOR
TOSHIO NUMAKURA
BY Paul M. Craig, Jr.
ATTORNEY

United States Patent Office 3,308,375
Patented Mar. 7, 1967

3,308,375
SCALE SPAN CHANGING INPUT CIRCUIT FOR SELF-BALANCING INSTRUMENT
Toshio Numakura, Tokyo, Japan, assignor to Hitachi, Ltd., Tokyo, Japan, a corporation of Japan
Filed Nov. 26, 1963, Ser. No. 325,962
Claims priority, application Japan, Nov. 26, 1962, 37/51,968
4 Claims. (Cl. 323—74)

The present invention relates to new and improved scale span changing input circuits for self-balancing instruments which can easily and accurately change the scale span of self-balancing instruments to prevent such instruments from being driven off-scale by input signals of too great a magnitude for a given setting of the instrument.

In practicing the invention a self-balancing instrument of the type employing a potentiometer having a movable contact for varying the output potential derived therefrom and a servo-amplifier controlling the output of the potentiometer, are provided. In this combination, the invention makes avaialble an improvement comprising a scale span changing inptu circuit including a first variable impedance connected in series circuit relationship with an input signal source whose magnitude is to be measured. The series circiut thus comprised is connected across the input to the servo amplifier. A second variable impedance is connected in series circuit relationship with the output from the potentiometer across the first variable impedance to form a parallel compensation network. The parallel compensation network comprised by the first and second variable impedances and the output from the potentiometer are then connected in series circuit relationship across the input to the servo ampilfier.

The invention will be explained referring to the accompanying drawings.

FIG. 1 is a functional block diagram showing the structural principle of a self-balancing instrument. FIGS. 2 and 3 illustrate two conventional scale span changing input circuits for such instruments. FIGS. 4, 5, 6 and 7 show the new and improved input circuits for scale span changing of self-balancing instruments embodying the present invention. In the following description, the term "scale span" refers to the magnitude range of electric input signals that can be measured by the instrument.

The self-balancing instrument shown in FIG. 1 is comprised by a servo-amplifier SA, a servo-motor SM, a potentiometer P, a gear RG connecting the rotating shaft of said servo-motor SM to the sliding contact S of said potentiometer P, $Ei$ input voltage, and $Ef$ (feedback) reference voltage. In the instrument of such a structure if input voltage $Ei$ is higher than the maximum output voltage $Er$, then the instrument will be driven off-scale, that is, the output indicator of the instrument exceeds the scale range thereof.

Although various scale span changing methods and circuits have been provided to prevent the instrument from being driven off-scale, none of them are free from defects and hence have been unsatisfactory. To be particular, a conventional method illustrated in FIG. 2 changes scale span by adjusting variable resistances $R_1$ and $R_2$. In this method when the source impedance of input signal source $Ei$ is taken into consideration, $Ef$ is calculated by the following formula where $r$ is the internal impedance of the signal source $Ei$.

$$Ef = \frac{R_1}{R_1+R_2+r}Ei$$

$$\simeq \frac{R_1}{R_1+R_2}\left(1-\frac{r}{R_1+R_2}\right)Ei \quad (1)$$

From a consideration of expression (1), it can be appreciated that with the scale span changing circuit of FIGURE 2, the actual indication obtained from an instrument using this circuit will have a comparative error $$\frac{r}{R_1+R_2}$$

The source impedance $r$ of said signal source varies with types of signal source. When $r$ is almost equal to $R_1+R_2$, it brings about an indicating error ranging anywhere from one to one hundred percent of the real value.

In another prior art circuit shown in FIG. 3 an input variable resistance $Ri$ and a feedback variable resistance $Rf$ are employed. From the relation represened by the following formula $$Ef = \frac{Rf}{Ri}Ei \quad (2)$$

it is clear that scale span of an instrument employing this circuit can be changed by changing said two resistances. However, in this circuit too, the source impedance $r$ of the signal source brings about a comparative indicating error $r/Ri$. Such an error is caused by electrical voltage drop $I_i r$ caused by current flow in the input signal source. In the circuit shown in FIG. 2 the input current $Ii$ is equal to $$\frac{Ei}{R_1+R_2}$$

and in the other circuit which is shown in FIG. 3 the input current is equal to $Ei/Ri$.

According to the present invention the problems as stated above are overcome by the basic circuit arrangement embodying the present invention shown in FIG. 4. In this circuit a series combination of a first step variable resistance $R_1$ and a second step variable resistance $R_2$ is connected to the output terminals of potentiometer P, whereby the voltage drop of $R_1$ determine the feedback voltage $Ef$. In this method $Ef$ becomes equal to $Ei$ ($Ef=Ei$) so as not to introduce any error in the instrument output indication as is the case with the prior art scale span changing circuits shown by FIGS. 2 and 3. In this circuit the output voltage $Ef'$ of the potentiometer circuit P is represented in the following formula.

$$Ef' = \frac{R_1+R_2}{R_1}Ef$$

$$= \frac{R_1+R_2}{R_1}Ei$$

A practical scale span changing input circuit for a self-balancing instrument embodying said basic circuit is shown in FIG. 5. In the FIGURE 5 circuit, 1, 2, 3, 4, 5 and 6 are notches and S' is a scale span changing contact maker. In this circuit when the changing contact maker S' is in contact with notch 1, $Ef'$ corresponds to the scale span or range of values where $Ei=0\sim10$ mv. in an overall range of $0\sim4$ v., and when in contact with notch 2, $Ef'$ corresponds to $Ei=0\sim20$ mv. which also is included in the $0\sim4$ v. overall range. The relation between the contact position of the contact maker S' and input voltage span is shown in the following table. The scale span can be changed by operating the contact maker S'.

| Notch No.: | Input voltage span |
|---|---|
| 1 | mv__ 0~10 |
| 2 | mv__ 0~20 |
| 3 | mv__ 0~100 |
| 4 | mv__ 0~200 |
| 5 | v__ 0~1 |
| 6 | v__ 0~2 |

With the new and improved input circuit arrangement of FIGURE 5, if it is assumed that the change-over contacter S' is connected to the notch 1 and in the magnitude of input voltage is 0–10 mv., then if the input voltage shifts to 0–20 mv. the contacter S' may be readily and quickly connected to the notch 2, or connected to the notch 3 if E$i$ goes to 0–100 mv. Thus, the scale span of the instrument employing the input circuit is readily changed due to the fact that the reference voltage E$f$ becomes two times and five times its previous value by operating the change over contacter S' as above mentioned. Consequently, even if the input voltage E$i$ becomes large, it is possible to prevent the output indicator from exceeding the scale range by merely operating the change over contacter S'.

Figure 6:
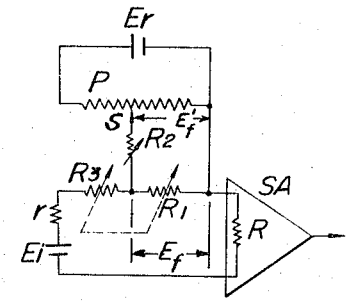

With the scale span changing circuit of FIG. 4, it is inconvenient but true that the sensitivity is subject to the change of scale span. To prevent the sensitivity from being varied with changes in the scale span, it is necessary to use a compensating resistance $R_3$ in series to the input signal source E$i$ as shown in FIGURE 6. $R_3$ is variable and is changed with the change of feedback voltage resistance $R_1$ as shown in FIG. 6. By this arrangement, voltage E at the terminals of input impedance R of servo-amplifier SA (shown in FIGURE 5) does not vary with the change of scale span, while E$f'$ changes within the range of $0 \sim Er$. Voltage E is represented in the following formula.

$$E = \frac{RR_3}{R_1R_2+(R_1+R_2)(R_3+R)} Ef'$$
$$= KEf' \quad (3)$$

Accordingly $R_3$ needs to be changed so that K in the formula may be constant regardless of change of $R_1$ and $R_2$. $R_3$ to satisfy said requirement can be calculated by the following formula.

$$R_3 = \frac{RR_1}{KR_0} - R_1 + \frac{R_1^2}{R_0} - R$$
$$(R_0 = R_1 + R_2) \quad (4)$$

In the embodiment of the invention shown in FIG. 5 where $R_0 = 400 K\Omega$, $R = 1 K\Omega$, $$K = \frac{1}{800}$$

compensating resistance $R_3$ can be calculated by Formula 4 as follows.

$$R_3 = 2R_1 - R_1 + \frac{R_1^2}{400} - 1$$
$$= R_1 - 1 + \frac{R_1^2}{400}$$

Consequently correlation among E$i$, $R_1$ and $R_3$ is as shown in the following table.

| E$i$ (mV) | $R_1$ (K$\Omega$) | $R_3$ (K$\Omega$) |
|---|---|---|
| 0~10 | 1 | 0.0025~0 |
| 0~20 | 2 | 1.01~1 |
| 0~100 | 10 | 9.25 |
| 0~200 | 20 | 20 |
| 0~1,000 | 100 | 124 |
| 0~2,000 | 200 | 299 |

Figure 7:
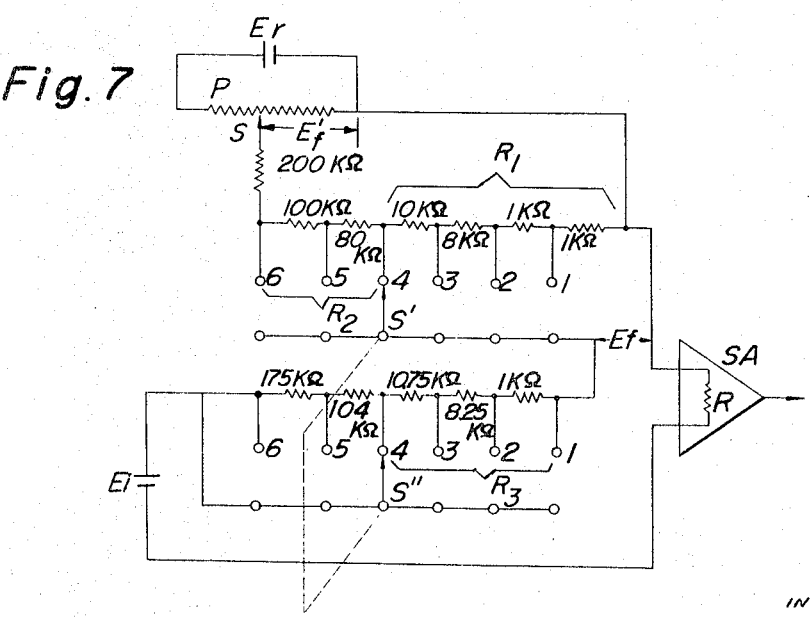

From above stated correlation it is clear that with an input circuit according to the invention as shown in FIG. 7, change of scale span of the self-balancing instrument with which it is used, causes neither indicating error nor change in sensitivity. S'' is a scale span changing contact maker for step variable resistor $R_3$, and is interlocked to S'.

From the foregoing description, it can be appreciated that the invention makes available a number of new and improved scale span changing input circuits for self-balancing instruments which can easily and accurately change the scale span of self-balancing instruments to prevent such instruments from being driven off-scale without adversely effecting the sensitivity of the instruments.

Having described several embodiments of a new and improved scale span changing input circuit constructed in accordance with the invention, it is believed obvious that other modifications and variations of the invention are possible in the light of the above teachings. It is therefore to be understood that changes may be made in the particular embodiments of the invention described which are within the full and intended scope of the invention as defined by the appended claims.

What is claimed is:

1. In a self-balancing instrument of the type employing a potentiometer having a movable contact for varying the output potential derived therefrom and a servo-amplifier controlling the output of the potentiometer, the improvement comprising a scale span changing input circuit including a first variable impedance connected in series circuit relationship with an input signal source whose magnitude is to be measured across the input to the servo-amplifier, and a second variable impedance connected in series circuit relationship with the output from the potentiometer across the first variable impedance to form a parallel compensation network in a manner such that the input signal source and the parallel compensation network comprised by the first and second variable impedances and the output from the potentiometer are connected in series circuit relationship across the input to the servo amplifier.

2. The instrument set forth in claim 2 wherein the first and second variable impedances comprise stepped variable resistors whose stepped resistance value can be varied simultaneously by a common control member.

3. The instrument set forth in claim 1 further characterized by a third variable impedance connected in series circuit relationship with the input signal source and the parallel compensation network across the input to the servo-amplifier.

4. The instrument set forth in claim 3 wherein the first, second and third variable impedances comprise stepped variable resistors whose stepped resistance value can be varied simultaneously by a common control member.

References Cited by the Examiner

UNITED STATES PATENTS 2,835,856  5/1958  Moseley _____ 318—28

FOREIGN PATENTS 867,851  5/1961  Great Britain.

JOHN F. COUCH, *Primary Examiner.*

A. D. PELLINEN, *Assistant Examiner.*